Nov. 6, 1928.  
W. D. KMENTT  
1,690,171  
AUTOMATIC CLASSIFYING DEVICE  
Filed Nov. 18, 1926   6 Sheets-Sheet 4

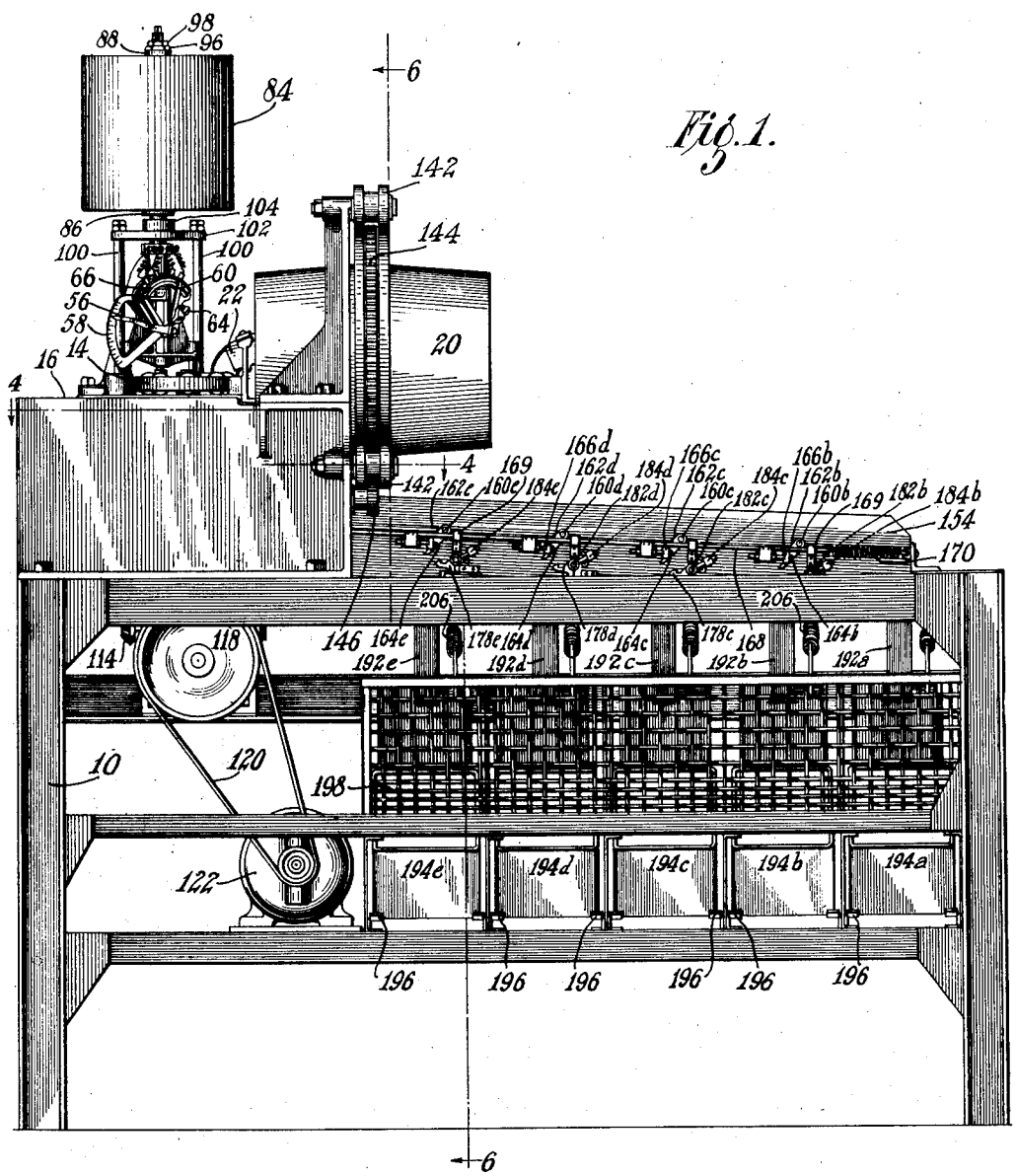

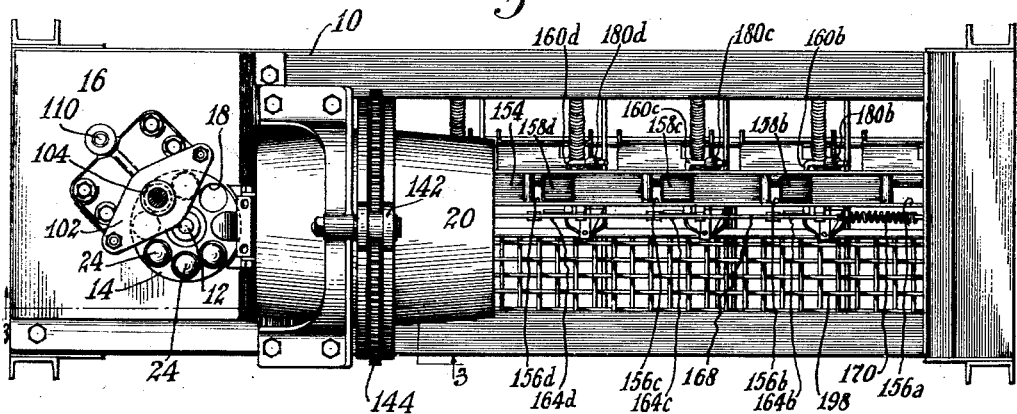
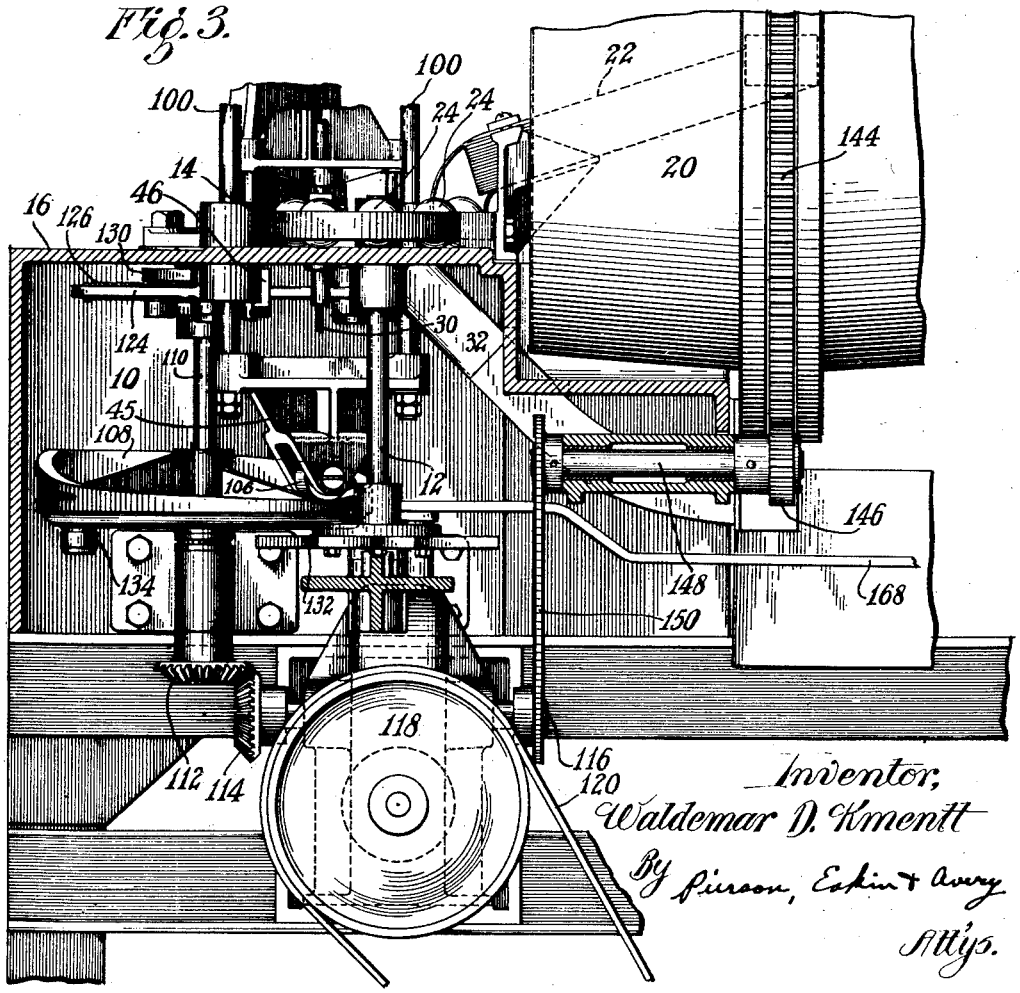

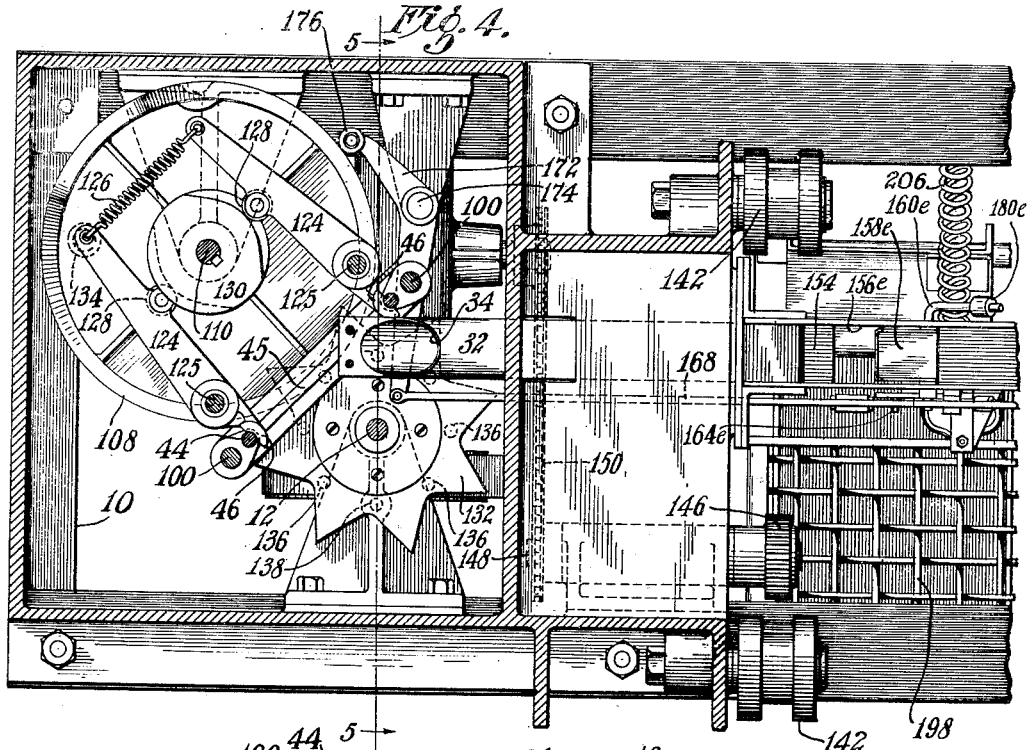
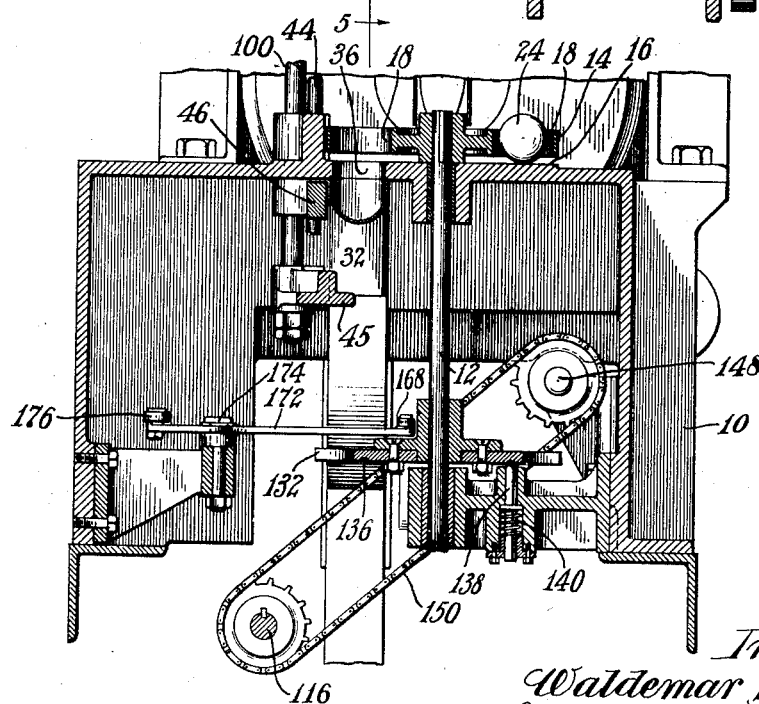

Inventor  
Waldemar D. Kmentt  
By Pierson, Eskin & Avery  
Attys.

Nov. 6, 1928.
W. D. KMENTT
AUTOMATIC CLASSIFYING DEVICE
Filed Nov. 18, 1926     6 Sheets-Sheet 5
1,690,171
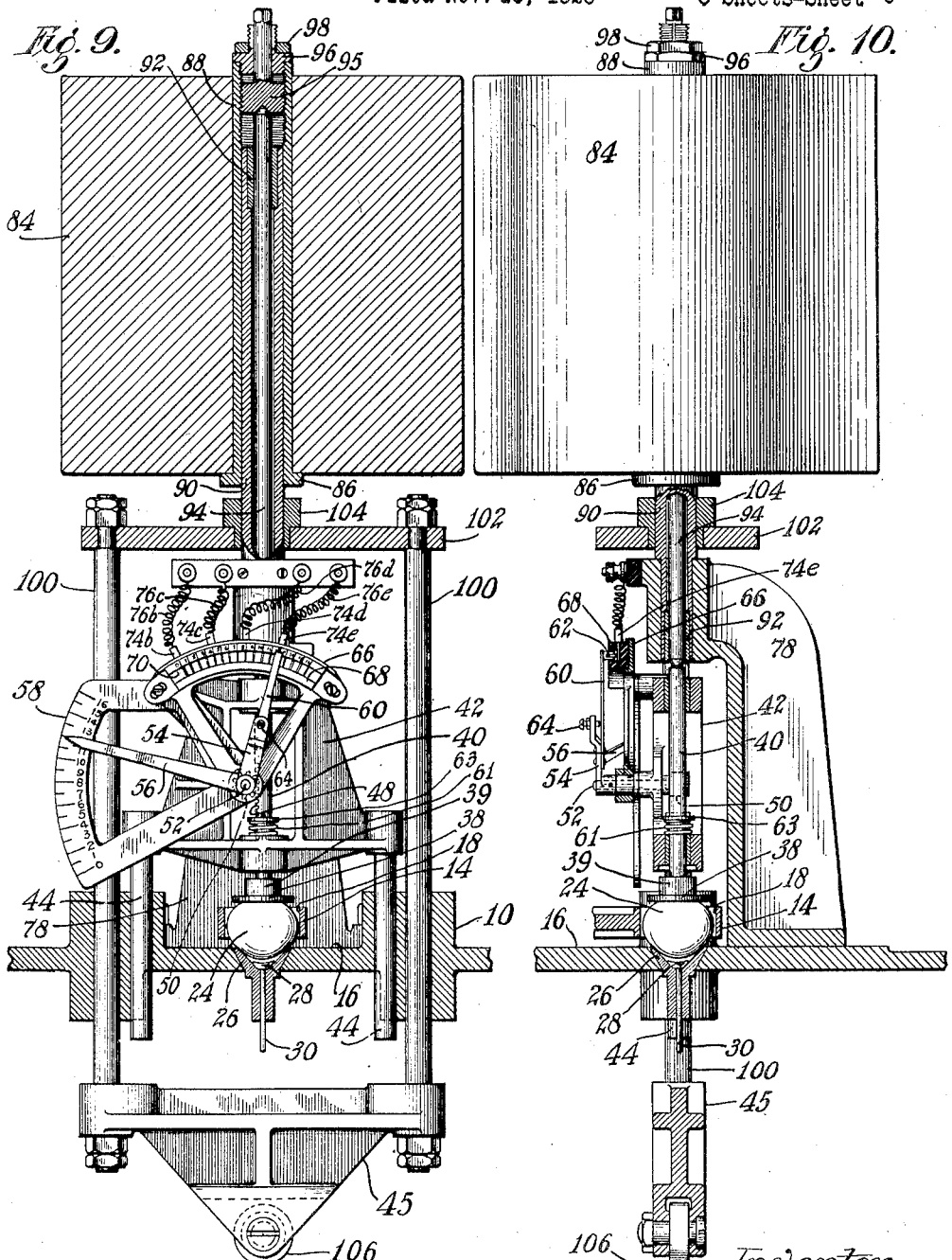

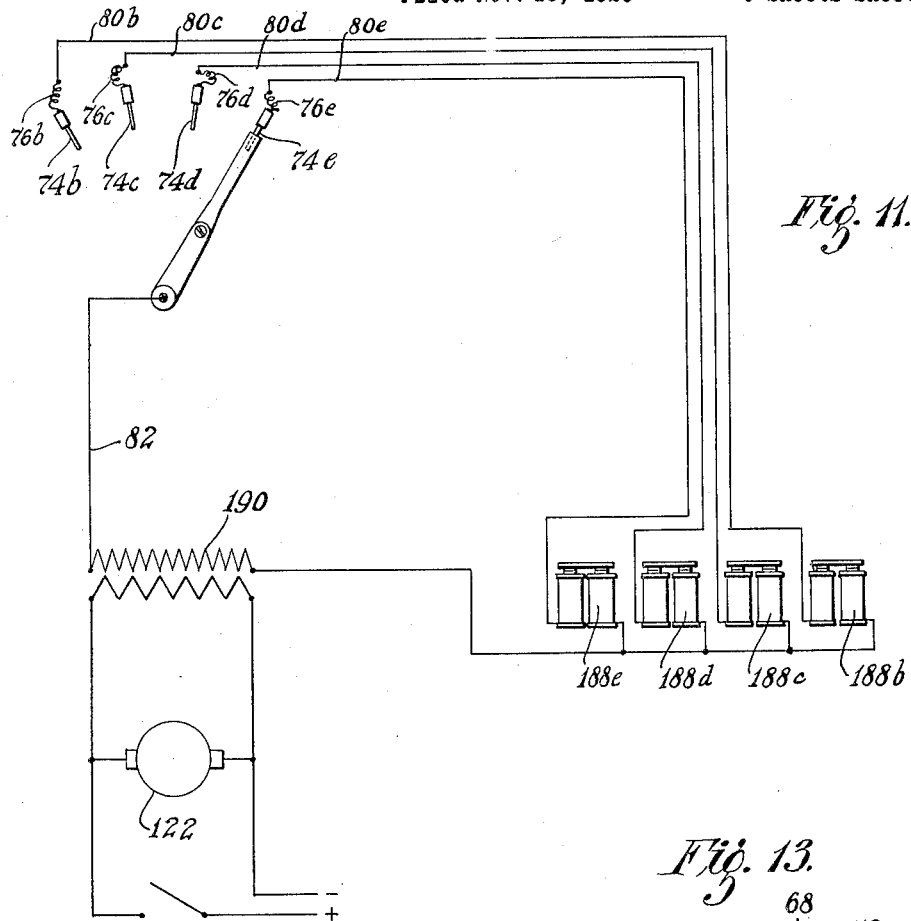
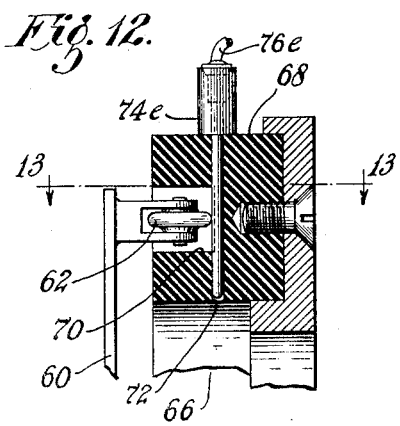
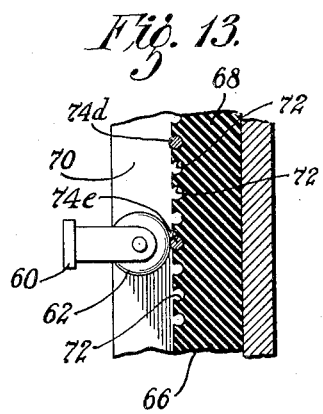

Patented Nov. 6, 1928.

1,690,171

UNITED STATES PATENT OFFICE.

WALDEMAR D. KMENTT, OF AKRON, OHIO, ASSIGNOR TO THE B. F. GOODRICH COMPANY, OF NEW YORK, N. Y., A CORPORATION OF NEW YORK.

AUTOMATIC CLASSIFYING DEVICE.

Application filed November 18, 1926. Serial No. 149,116.

This invention relates to methods and apparatus for classifying a succession of similar articles in accordance with a characteristic thereof such as their hardness or resistance to deformation, the machine here shown for illustration being adapted to sort golf-ball centers or cores in accordance with their deformability under a given pressure. Certain features disclosed in the present application are described and claimed in the patent of the present applicant and Harry E. Waner, No. 1,656,330, granted January 17, 1928.

My chief objects are to provide for automatic operation, dependability, accuracy and simplicity of construction in such a device.

Of the accompanying drawings:

Fig. 1 is a side elevation of a machine embodying and adapted to carry out my invention in its preferred form.

Fig. 2 is a plan view of all of the machine except a weighting structure, the supporting bar of which is shown in section.

Fig. 3 is a longitudinal, vertical section, on line 3—3 of Fig. 2, of parts of the machine at the measuring position.

Fig. 4 is a section on line 4—4 of Fig. 1.

Fig. 5 is a section on line 5—5 of Fig. 4.

Fig. 9 is a sectional view of parts of the machine at the measuring position.

Fig. 10 is a similar view from the right of Fig. 9.

Fig. 11 is a diagram of the electric wiring.

Fig. 12 is a vertical cross-section, on a large scale, of an electric contact device.

Fig. 13 is a section on line 13—13 of Fig. 12.

Figure 6:
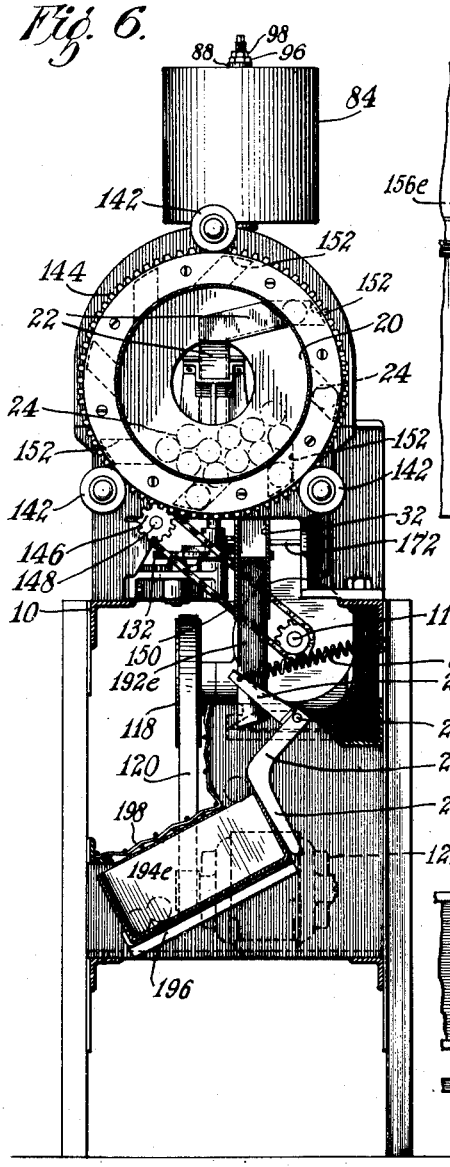
Fig. 6 is a section on line 6—6 of Fig. 1.

Referring to the drawings, the machine comprises a frame 10 in which is journaled a vertical shaft 12 (see Fig. 3) having secured upon its upper end a turnstile or turret 14 positioned just over a table portion 16 of the frame 10. The turnstile is formed with a circumferentially-spaced series of ball-receiving apertures 18, 18 (see Fig. 5) adapted to receive in order from a periodic-delivery hopper 20, through a spout 22, the successive balls, 24, 24, which may be golf-ball cores or the like, the turret being adapted in being rotated step-by-step, to propel the balls over the table 16 and bring each in succession, for the measuring operation, onto a cup-shaped support or rest 26 (see Figs. 9 and 10) which is mounted in the table 16, and which is provided with an ejector 28 having a downwardly-projecting stem 30 adapted to be engaged by a cam-actuated, vertically-reciprocating yoke 45 for subsequently lifting the ball from the support so as to permit the turret to impel the ball forward in its orbit and cause the ball to drop into a chute 32 having its mouth 34 (Figs. 4 and 5) in registry with a discharge aperture 36 in the table 16.

For measuring the deformability of each ball while it rests upon the support 26 a presser foot 38 (see Figs. 9 and 10) is secured upon the lower end of a stem 40 which is slidably mounted in an open-center, floating bracket 42 supported by bars 44, 44 which are slidably mounted in the table portion 16 of the frame and are exposed below the same for engagement with cam-actuated clamps 46, 46 (Figs. 3, 4 and 5) for holding the bracket 42 at such position as it assumes when the weight of the bracket and parts carried thereby is imposed upon the ball, the bars 44 being adapted to be engaged by the vertically-reciprocating yoke 45 for lifting the bracket 42 and presser foot 38 from each ball and lowering them onto the next, and the presser foot 38 being formed with a boss or shoulder 39 adapted to sustain the weight of the bracket when the latter is lowered onto the ball.

The stem 40 in the central opening of the bracket 42 is formed with rack teeth 48 which are meshed with a pinion 50 (Figs. 9 and 10) secured upon a shaft 52 journaled in the bracket and having secured on its other end an indicator 54 having an arm 56 registering upon a visual scale 58 mounted upon the bracket, the indicator also having a spring arm 60 carrying at its outer end an electric contact roller 62. Mounted in a bracket portion of the indicator is a set-screw 64 adapted to be set up against the spring arm 60 to determine the force of the contact roller 62 against an electric scale device 66 which is mounted upon the bracket 42. The arm 56 of the indicator is sufficiently heavy to avoid play of the pinion 50 with relation to the rack teeth 48, and for holding the presser foot 38 elevated with relation to the bracket when it is not loaded a compression spring 61 (Figs. 9 and 10) is interposed between the base of the bracket member 42 and a collar 63 secured upon the stem of the presser foot.

The electric scale device 66 comprises an adjustably-mounted arcuate block 68, of insulating material such as hard rubber, formed with an arcuate groove 70 in which the roller 62 runs and the block is formed with a series of closely-spaced, transverse, radially-disposed apertures 72, 72 (see Figs. 12 and 13) which are open to the groove 70 at the floor thereof so as to expose to the contact roller 62 a set of contact pins $74^b$, $74^c$, $74^d$, $74^e$, which may be mounted in the apertures 72 selectively so as to give such spacing between them as may be desired, according to the classification desired in the sorting of the balls. Each of the contact pins $74^b$ to $74^e$ is connected by a coiled wire, $76^b$ to $76^e$, with terminals, mounted upon an overhanging bracket or standard 78, of respective connectors $80^b$ to $80^e$, and the indicator has electric connection through its journal with the frame of the machine, which constitutes the connector 82 in the electric diagram of Fig. 11.

For imposing a determinate distorting force upon the ball after the weight of the bracket 42 and parts carried thereby has been imposed upon the ball, while the bracket 42 is held by the clamps 46 at the position which it assumes by gravity, an axially-apertured weight 84 fits upon and is supported by a lower end flange 86 of a sleeve 88 which is slidably mounted upon a hollow vertical guide post 90 fixed in and rising from the apertured overhanging portion of the standard 78.

The hollow guide post 90 is provided with antifriction bushings 92, 92 at its upper and lower ends, and in these is slidably mounted a push rod 94 whose lower end is tapered and bears upon the rounded upper end of the stem 40 of the presser foot 38, and whose upper end is tapered and mates with a central recess formed in the lower face of a screw plug 95 mounted in the upper end portion of the sleeve 88 and formed with a wrench-receiving stem which projects upward through an apertured closure plug 96 which is mounted in the upper end of the sleeve 88 and formed at its upper side as a tapered split bushing to receive a lock-nut 98 for locking the plug 95, in adjusted position, against rotation.

For lifting the weight 84 after each measuring operation, in advance of the lifting of the presser-foot bracket 42, and for lowering it onto the next ball after the said bracket 42 has been lowered, a pair of vertical lifting rods 100, 100 are mounted at their lower ends in the respective ends of the yoke 45 and have secured to their upper ends a cross-piece or yoke 102 formed centrally with an aperture in which is mounted a shouldered bushing 104 surrounding the guide post 90 and adapted to engage the lower end of the sleeve 88.

For vertically reciprocating the yoke 45 the lower portion thereof is formed as a forked journal mounting for a cam roller 106 resting upon a rotary cam 108 which is secured upon a vertical shaft 110 driven, through bevel gears 112, 114 from a shaft 116 having worm-drive connection with a belt pulley 118 connected by a belt 120 with a motor 122.

The clamps 46 for engaging the bars 44 to hold the presser-foot bracket 42 in position while the presser foot is further depressed by the weight 84, and thus to run the indicator 54 upon the scales 58, 66, are formed upon the adjacent ends of a pair of cam-actuated levers 124, 124 (Figs. 3 and 4) which are fulcrumed upon the frame at 125, 125 and have rearwardly extending arms connected by a pull-spring 126 and provided with respective cam rollers 128, 128 coacting with a cam 130 secured upon the vertical shaft 110 to force the rear arms of the levers apart, against the force of the spring 126 and thus to remove the clamps 46 from the posts 44 to permit the yoke 45 to raise the presser-foot bracket 42 from one ball and lower it onto the next.

For indexing the turret 14 at appropriate times a star-wheel 132 is secured upon a low part of the shaft 12 and is adapted to be turned, step-by-step, by a stud roller 134 (Figs. 3 and 4) projecting from the lower face of the cam wheel 108. To prevent overrunning of the turret 14 the star-wheel 132 is formed in its lower face with a series of detent recesses 136, 136 adapted in succession to receive a detent plunger 138 mounted in the framing and urged upward by a spring 140, the upper end of the plunger and the detent recesses being complementally rounded so that the star-wheel may be forcibly turned notwithstanding the engagement of the plunger.

The periodic delivery hopper 20 is of barrel shape with central end openings and is peripherally journaled for rotation on a horizontal axis within a set of rollers 142, 142 which are journaled upon the frame of the machine and each formed with a waist portion adapted to accommodate an external gear ring 144 secured upon the middle of the hopper and meshed with a pinion 146 having driving connection, through its shaft 148 and a sprocket chain 150 with the shaft 116.

Internally the hopper 20 is provided at its relatively large middle portion with a circumferential series of obliquely-disposed pockets 152, 152, each being adapted to receive a single one of the balls 24 when in the low part of its orbit and to carry the ball upward as the hopper rotates and drop the ball into the delivery chute 22, which is mounted upon the framing of the machine and has its receiving portion extending into the hopper through the adjacent end opening thereof and has its delivery end in position to deliver the successive balls to the turret 14.

Figure 7:
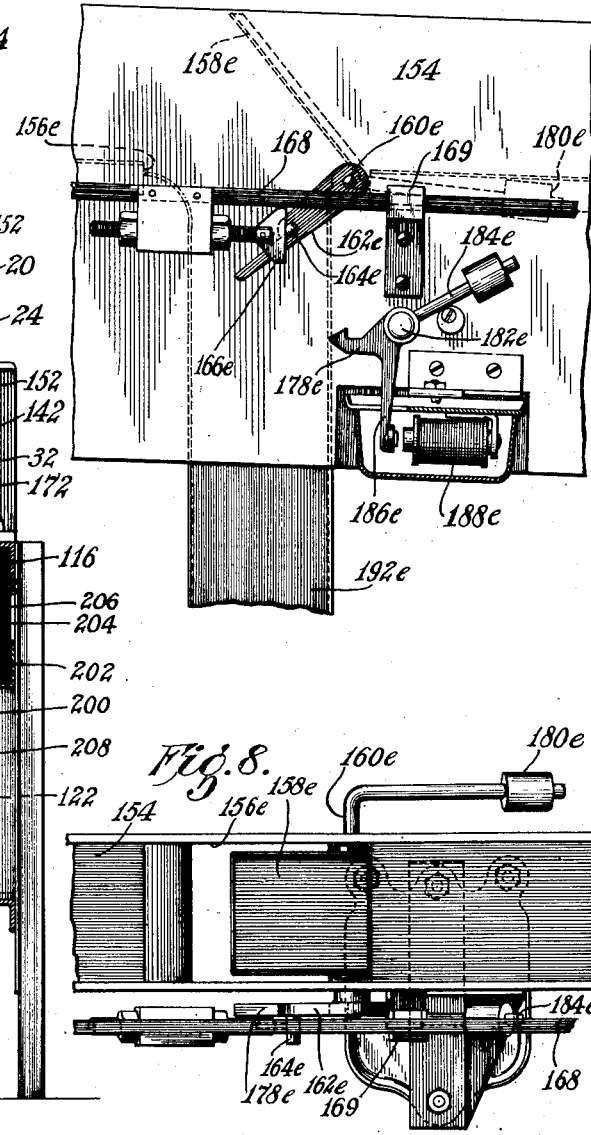
Fig. 7 is a side elevation on a large scale of one of the electrically controlled sorting devices and associated parts.
Figure 8:
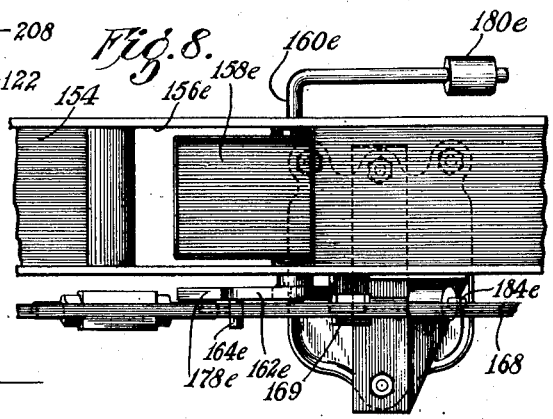
Fig. 8 is a plan view of the parts shown in Fig. 7.

For sorting the balls in accordance with their deformability as registered by the indicator 54, as they pass from the measuring device through the chute 32, the said chute leads into one end of a downwardly-sloping runway 154 whose floor is interrupted by a succession of trap-door openings 156$^a$ to 156$^e$ (Figs. 7 and 2). Hinged in the runway 154 in position to close each of the openings, except the farthest one, 156$^a$, is a trap door, 158$^b$ to 158$^e$, having secured to its hinge-pin, 160$^b$ to 160$^e$, outside of the runway a closing lever, 162$^b$ to 162$^e$, provided with a stud, 164$^b$ to 164$^e$, adapted to be engaged by one of a series of dogs, 166$^b$ to 166$^e$, each adjustably secured upon a pull rod 168 slidably mounted in brackets 169, 169 secured to the side of the runway, the far end of said rod being connected by a pull spring 170 with the machine frame, to urge it toward door-closing position, and the other end of the rod being hinged to a cam lever 172 (Figs. 4, 5 and 6) which is fulcrumed on the framing at 174 and is provided at its rear end with a roller 176 running upon the periphery of the cam wheel 108 to hold the rod 168 to the left as viewed in the drawings throughout the greater part of each cycle of operations, to permit to stand open such of the doors 158$^b$ to 158$^e$ as are not held closed by respective cam latches 178$^b$ to 178$^e$, so that the ball, moving down the runway by gravity, will drop through the first open doorway, each of the doors being urged toward open position by a weight, 180$^b$ to 180$^e$, secured upon the laterally-bent rear end portion of the hinge pin, 160$^b$ to 160$^e$, of the door. The cam wheel 108 is so formed as to permit the pull spring 170, after the passage of each ball, momentarily to draw the bar 168 to the right, and thus to close all of the doors that have been opened.

Each of the latches, 178$^b$ to 178$^e$, for first holding all of the doors closed and then releasing certain ones of them in accordance with the position of the indicator 54, is fulcrumed on the runway, as at 182$^b$ to 182$^e$, is provided with a weighted arm, 184$^b$ to 184$^e$, urging it toward latching position, and is formed with a downwardly-extending arm such as the arm 186$^e$, Fig. 7, adapted to be drawn to the right by an electro-magnet 188$^b$ to 188$^e$, the electro-magnets being in respective circuits including the connectors 80$^b$ to 80$^e$ (Fig. 11) which are adapted to be closed by contact of the roller 62 with the respective contact pins 74$^b$ to 74$^e$, the frame of the machine, constituting the connector 82 of the diagram in Fig. 11, being permanently connected with the coils of the several magnets through the secondary coil 190 of a transformer.

Leading downward from each of the door openings 156$^a$ to 156$^e$ is a chute, 192$^a$ to 192$^e$, terminating over and adapted to guide the balls which pass through the chute into a box, 194$^a$ to 194$^e$, supported thereunder upon brackets or rails 196, 196, from which the box may readily be withdrawn. 198 is a wire mesh guard adapted to prevent the balls from bouncing from the boxes. At the bottom of each chute 192 a closure member 200 is fulcrumed as at 202 (Fig. 6) and is provided with an arm 204 connected by a pull spring 206 with the machine frame, to urge the closure member toward the lower end of the chute to close the same and cause the balls to accumulate therein while the box 194 is removed for emptying, the closure member 200 being formed with a downwardly-extending arm portion 208 to be engaged by the end of the box in the replacing of the box to reopen the closure member and permit the accumulated balls to fall from the chute into the box.

In the operation of the machine, the several rotary parts being driven by the motor 122 and a supply of the balls 24 being placed in the hopper 20, successive balls are picked up in the respective pockets 152 of the hopper and discharged therefrom into the chute 22, the turret 14 being automatically indexed at such times that each of its apertures 18 receives one of the balls and propels it forward over the table 16 onto the support 26.

As each ball is received upon the said support the weight 84 and the presser-foot bracket 42 are held elevated and the ejector 28 is held up near the mouth of the cup-shaped support, all by the yoke 45, and the presser foot 38 is held elevated with relation to the bracket 42 by the weight of the indicator arm 56.

In further rotation of the cam wheel 108 the yoke 45 is lowered, first permitting the ejector 28 with the ball 24 thereon to seat in the support 26 and the weight of the bracket 42 and parts carried thereby to settle upon the presser foot 38 in contact with the ball, at which time the cam 130 permits the spring 126 to spread the clamps 46 against the respective posts 44 and thus to anchor the presser-foot bracket 42 in the position it has assumed by gravity. Continued descent of the yoke 45 then further lowers the weight 84 until it comes to bear with its full force upon the ball, through the rod 94 and the presser foot 38, the bushing 104 leaving the flange 86 of the sleeve 88 as shown in Figs. 9 and 10.

Thus a determinate deforming weight is applied to the ball, and as the presser-foot bracket 42 is held by the clamps 46 in the position determined by the deformation of the ball under the much smaller deforming force of the bracket assembly, which merely assures firm contact with the ball and but slightly deforms it, the relative movement of the presser foot after the bracket is clamped gives an accurate and dependable measure of the relative deformability of successive balls. This relative movement of the presser foot is registered by the indicator 54, through the action of the rack teeth 48 and pinion 50, and circuits are momentarily closed through such of the contact pins 74$^b$ to 74$^e$ as are passed over by the roller 62 in the movement of the indicator. The corresponding latches 178$^b$ et seq. are thus tripped, through the action of their electro-magnets, the door-closing rod 168 being at this time in its leftward position, and the farther the indicator moves on the scale the more of the doors 158$^b$ to 158$^e$, in succession from the far end of the runway toward the measuring portion of the machine, will be opened. The next movement of the turret 14, preceded by the lifting of the weight 84, the presser-foot bracket 42 and the ejector 30, by the yoke 45, will discharge the ball through the chute 32 into the runway 154, down which it will roll by gravity, dropping through the nearest of the open doorways. When the ball has dropped into the proper box 194, in accordance with its deformability as determined by the operation just described, the cam wheel 108 permits the spring 170 momentarily to pull the door-closing bar to the right, closing all the doors that were open, and the doors are automatically engaged and held closed by the latches 178$^b$ to 178$^e$, the indicator 54 having returned to zero of its own weight and the circuits of all of the electromagnets consequently being open.

If in the measuring operation a given ball is so resistant to deformation as to prevent the indicator's contact-roller 62 from reaching the first contact pin, 74$^b$, none of the circuits will be closed and as none of the doors 158$^b$ to 158$^e$ will be permitted to open the ball will roll the full length of the runway and drop into the last box, 194$^a$. If, however, the roller goes far enough to contact the pins 74$^b$ and 74$^c$, for example, both the corresponding doors, 158$^b$ and 158$^c$, will open, but the ball will be intercepted by the open door 158$^c$ and will pass through its doorway 156$^c$ into the box 194$^c$. Similarly the others of the boxes 194$^a$ to 194$^e$ will receive balls in accordance with their deformability in the continued operation of the machine as described, and the operator is required only to keep the hopper supplied with balls and to empty the receiving boxes from time to time.

Modifications are possible within the scope of my invention as defined in the appended claims.

I claim:

1. Apparatus of the character described comprising a rest for an article, means for compressing the article against said rest with a relatively small determinate force, means for further compressing the article against said rest with a greater determinate force, means for registering the increase of deformation of the article resulting from the application of the second mentioned force, and means for actuating the two force-applying means in timed relation in cyclic operation.

2. Apparatus of the character described comprising a rest for an article, a structure adapted to be brought to bear upon an article to compress it against said rest with a determinate force, means for holding a part of the said structure in the position which it thus assumes, means for further forcing another part of the said structure against the article further to compress it against the said rest, and means controlled by relative movement of the two parts of the said structure for registering the degree of deformation of the article effected by such further compression thereof.

3. Apparatus of the character described comprising a rest for an article, a presser foot adapted to be brought to bear against an article with determinate force to compress the article against the rest, a member associated with the presser foot for relative movement of the two and adapted to be stopped in a position determined by the article's stoppage of the presser foot, means for holding the said member in such position, means for further pressing the presser foot against the article with a determinate force, and a rack-and-pinion device interposed operatively between the presser foot and the said member for registering the relative movement of the two incident to such further pressing of the presser foot.

4. Apparatus of the character described comprising a support for an article, a vertically-slidable structure mounted thereover, a presser foot mounted for relative vertical sliding movement on said structure, stop means adapted to limit the upward movement of the presser foot on said structure, yielding means for urging the presser foot upward on said structure, a weight adapted to be brought to bear upon said presser foot, and means for raising and lowering the said structure and the said weight in determinate order.

5. Apparatus as defined in claim 4 including means for passing articles in succession onto and off of the support in time with the actuation of the vertically-slidable structure and the weight.

6. Apparatus as defined in claim 4 including means timed with the raising and lowering means for holding the vertically-slidable structure in the position which it assumes when its weight is imposed upon an article mounted on the support.

7. Apparatus of the character described comprising a cup-shaped support for a succession of articles, article-impelling means for mounting articles in succession on and removing them from the support, means for measuring the compressibility of each article while it is on the support, an ejector in the support, and means timed with the article-impelling means for actuating the ejector.

8. Apparatus as defined in claim 7 including a table member having its upper surface substantially flush with the mouth of the cup-shaped support, the article-impelling means being adapted to propel the articles while they rest upon the said surface, and the table member being formed with a discharge aperture for the articles adjacent the support.

In witness whereof I have hereunto set my hand this 16th day of November, 1926.

WALDEMAR D. KMENTT.